United States Patent
Wu (10) Patent No.: US 9,990,306 B2
(45) Date of Patent: Jun. 5, 2018

(54) INTER-MANYCORE COMMUNICATIONS METHOD AND SYSTEM

(71) Applicant: Huawei Technologies Co., Ltd., Shenzhen (CN)

(72) Inventor: Xiaoke Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 285 days.

(21) Appl. No.: 14/920,331

(22) Filed: Oct. 22, 2015

(65) Prior Publication Data

US 2016/0041923 A1 Feb. 11, 2016

Related U.S. Application Data

(63) Continuation of application No. PCT/CN2013/087395, filed on Nov. 19, 2013.

(30) Foreign Application Priority Data

Apr. 26, 2013 (CN) .......................... 2013 1 0150599

(51) Int. Cl.
*G06F 12/10* (2016.01)
*G06F 9/54* (2006.01)
(Continued)

(52) U.S. Cl.
CPC .......... *G06F 12/1072* (2013.01); *G06F 9/544* (2013.01); *G06F 9/546* (2013.01);
(Continued)

(58) Field of Classification Search
CPC ...... G06F 12/1072; G06F 9/544; G06F 9/546; G06F 2212/1016; G06F 2212/65
See application file for complete search history.

(56) References Cited

U.S. PATENT DOCUMENTS

2009/0144510 A1 6/2009 Wibling et al.
2012/0036334 A1* 2/2012 Horman ................ G06F 12/109
711/165

FOREIGN PATENT DOCUMENTS

| CN | 1811717 A | 8/2006 |
| CN | 101246466 A | 8/2008 |
| CN | 101727351 A | 6/2010 |

OTHER PUBLICATIONS

Beckman, N., et al., "Distributed Naming in a Factored Operating System," Retrieved from the Internet: URL: http://18.7.29.232/bitstream/handle/1721.1/62460/711199481-MIT.pdf?sequence=2 [retrieved on Mar. 2, 2016], Oct. 7, 2010, 87 pages.

(Continued)

*Primary Examiner* — Umut Onat
(74) *Attorney, Agent, or Firm* — Conley Rose, P.C.

(57) ABSTRACT

An inter-manycore communications method includes applying, by a service manager process, to a microkernel operating system for shared memory, and mapping shared memory, which is allocated by the microkernel operating system, to virtual address space of the service manager process; receiving and recording a service identifier of a system service process and a second shared memory address that corresponds to the service identifier; searching, according to a service identifier carried by a system service request, for the second shared memory address that corresponds to the service identifier carried by the system service request; and sending the service identifier carried by the system service request, a first shared memory address, and the second shared memory address that corresponds to the service identifier to a user process. According to the method, a problem that communication between a user process and a system service process needs multiple context switches can be solved.

10 Claims, 6 Drawing Sheets

(51) Int. Cl.
  *G06F 12/1072* (2016.01)
  *G06F 15/167* (2006.01)
(52) U.S. Cl.
  CPC .... *G06F 15/167* (2013.01); *G06F 2212/1016* (2013.01); *G06F 2212/65* (2013.01)

(56) References Cited

OTHER PUBLICATIONS

Belay, A., et al., "Message Passing in a Factored OS," Retrieved from the Internet: URL:http://dspace.mit.edu/bitstream/handle/1721.1/66407/755082145-MIT.pdf?sequence=2 [retrieved on Mar. 2, 2016], Jun. 21, 2011, 60 pages.

Wentzlaff, D., et al., "Fleets: Scalable Services in a Factored Operating System," Computer Science and Artificial Intelligence Laboratory Technical Report, MIT-CSAIL-TR-2011-012, Retrieved from the Internet: URL:http://dspace.mit.edu/bitstream/handle/1721.1/61640/MIT-CSAIL-TR-2011-012.pdf?sequence=1, [retrieved on Mar. 2, 2016], Mar. 9, 2011, 16 pages.

Foreign Communication From a Counterpart Application, European Application No. 13882839.7, Extended European Search Report dated Mar. 17, 2016, 9 pages.

Partial English Translation and Abstract of Chinese Patent Application No. CN101727351, dated Jan. 30, 2016, 16 pages.

Foreign Communication From a Counterpart Application, PCT Application No. PCT/CN2013/087395, English Translation of International Search Report dated Feb. 27, 2014, 2 pages.

Foreign Communication From a Counterpart Application, PCT Application No. PCT/CN2013/087395, English Translation of Written Opinion dated Feb. 27, 2014, 7 pages.

"The Principle and Application of Embedded System" Based on XScale and Windows CE 6.0, Aug. 2009, 5 pages.

English Translation of "The Principle and Application of Embedded System" Based on XScale and Windows CE 6.0, Aug. 2009, 5 pages.

Foreign Communication From a Counterpart Application, Chinese Application No. 201310150599.2, Chinese Office Action dated Mar. 9, 2017, 8 pages.

\* cited by examiner

INTER-MANYCORE COMMUNICATIONS METHOD AND SYSTEM

CROSS-REFERENCE TO RELATED APPLICATIONS

This application is a continuation of International Application No. PCT/CN2013/087395, filed on Nov. 19, 2013, which claims priority to Chinese Patent Application No. CN 201310150599.2, filed on Apr. 26, 2013, both of which are hereby incorporated by reference in their entireties.

TECHNICAL FIELD

The present disclosure relates to the field of computer hardware technologies, and in particular, to an inter-manycore communications method and system.

BACKGROUND

A microkernel operating system structure, which has developed since the late 1980s of the 20$^{th}$ century, is quite applicable to a distributed system environment because it effectively supports running of multiprocessors. A microkernel is an operating system kernel that can provide necessary services, where the necessary services include tasks, threads, inter process communication (IPC), memory management, and the like. All services (including device drive) of the microkernel run in user mode, processing the services is the same as processing other programs, and each service runs in its address space; therefore, the services are protected from each other.

Figure 1:
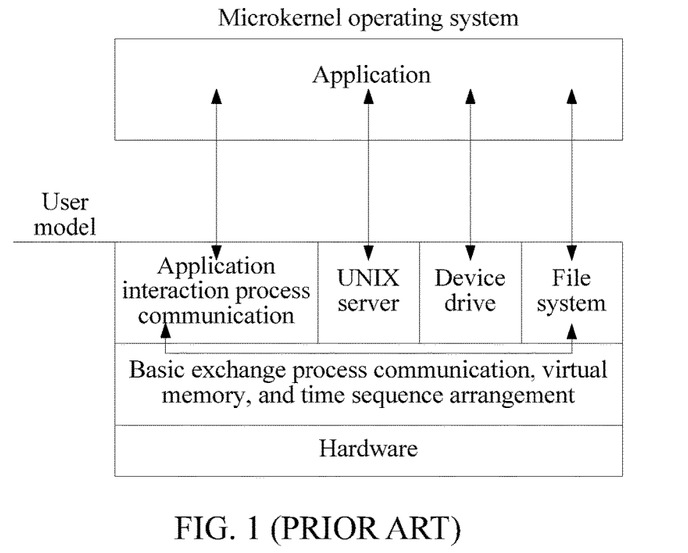
FIG. 1 is a schematic diagram of a microkernel operating system based on a client/server model in the prior art.
Figure 2:
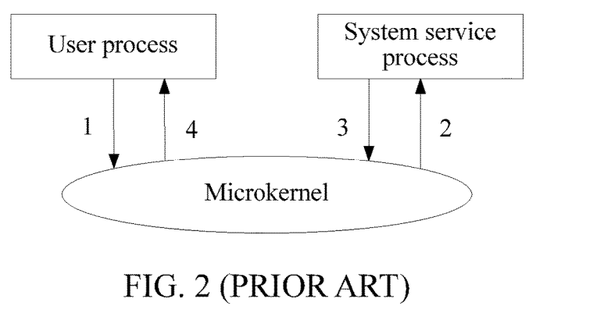
FIG. 2 is a schematic diagram of communication interaction between a user process and a system service process in a manycore architecture in the prior art.

FIG. 1 is a schematic diagram of a microkernel operating system based on a client/server model in the prior art. In FIG. 2, both a user process and a system service are connected to a microkernel. When a user needs to request a system service, the user first sends, using the user process, request information 1 for requesting a system service to the microkernel; the microkernel responds 2 to the received request information, and schedules a system service process corresponding to the request information; after processing the request from the user, the system service sends a message 3 to a kernel; and finally, the kernel responds 4 to the received message, and schedules the user process that previously needs to request the system service.

In a manycore architecture, multiple microkernel instances simultaneously exist, one independent microkernel instance runs on each central processing unit (CPU), and each process in user mode can be randomly placed on the microkernel instances for running. Therefore, a user process and a system service process may not run on a same microkernel, and in this case, an IPC inter-manycore communications mechanism needs to be used for information exchange between the user process and the system service process.

Figure 3:
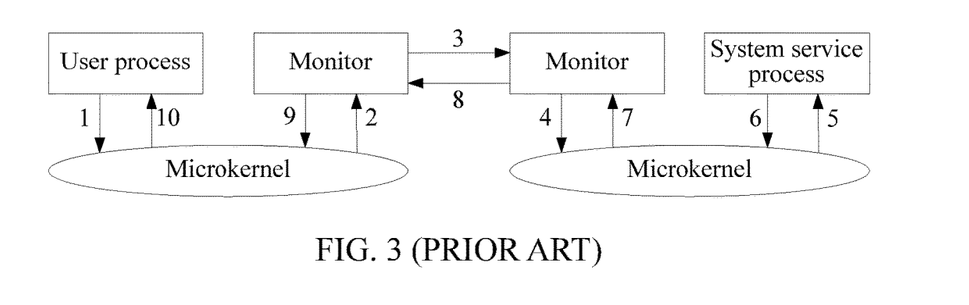
FIG. 3 is another schematic diagram of communication interaction between a user process and a system service process in a manycore architecture in the prior art.

FIG. 3 is a schematic diagram of communication interaction between a user process and a system service process in a manycore architecture in the prior art. As shown in FIG. 3, for IPC inter-manycore communication, an agent service monitor needs to run on each microkernel. The Monitor is responsible for managing a data structure of the microkernel, and coordinating intra-manycore communication and inter-manycore communication. In addition, after a system is started, all Monitors in the system are fully connected, that is, every two Monitors are connected. Moreover, each Monitor uses an array to maintain a service list on a microkernel on which the Monitor runs, and provides a global unique identifier for each service in the system.

When requesting a service, a user process first sends a message 1 to a microkernel, the microkernel schedules 2 running of a Monitor, and the Monitor determines, according to content of the message, whether a system service requested by a user is on a same microkernel; and if the system service requested by the user is not on the same microkernel, processing is performed according to FIG. 3, that is, a local Monitor sends a message 3 to a Monitor on a microkernel on which the requested system service is located, where message communication in this procedure uses an IPC inter-manycore communications mechanism. Then a remote Monitor sends a message 4 to a microkernel on which the remote Monitor is located, and the microkernel schedules 5 a target service process. After processing the message, a target service sends a message 6 to the microkernel, the microkernel schedules 7 a Monitor, the Monitor sends, by means of IPC inter-manycore communication, the message 8 to a Monitor on a microkernel on which the required system service is located, the Monitor then sends the message 9 to the microkernel, and finally, the microkernel schedules 10 the user process. In this way, a procedure of scheduling, by means of a request and a response, a user process and a service process that are not on a same microkernel is completed.

As can be seen from FIG. 2, when a user process and a system service process are both on a same microkernel, a context switch needs to be performed at least four times, that is, a message exchange procedure needs to be performed at least four times.

FIG. 3 is another schematic diagram of communication interaction between a user process and a system service process in a manycore architecture in the prior art. FIG. 3 shows that, when a user process and a system service process are not on a same microkernel, a context switch needs to be performed at least eight times and IPC inter-manycore communication needs to be performed at least twice. If the system service process cannot process a user process request and needs to call another service, the context switch and the inter-manycore communication each need to be performed more times. However, in an early monolithic kernel (Mono Kernel) operating system, a context switch needs to be performed only twice.

Therefore, the prior art has a problem that in a manycore architecture of a microkernel, communication between a user process and a system service process needs multiple context switches, and efficiency of a microkernel operating system is relatively low.

SUMMARY

Embodiments of the present disclosure provide an inter-manycore communications method, so as to solve a problem in the prior art that in a manycore architecture of a microkernel, communication between a user process and a service process needs multiple context switches and efficiency of a microkernel operating system is relatively low.

According to a first aspect, an inter-manycore communications method includes applying, by a service manager Service Manager process, to a microkernel operating system for shared memory, and mapping first shared memory, which is allocated by the microkernel operating system, to virtual address space of the Service Manager process; receiving, by the Service Manager process, a registration message of a system service process, and recording a service identifier of the system service process and a second shared memory address that corresponds to the service identifier, where the service identifier and the second shared memory address are carried by the registration message; sending, by the Service Manager process, a response message of the registration message to the system service process, where the response message carries a first shared memory address; receiving, by the Service Manager process, a system service request of a user process, and finding, according to a service identifier carried by the system service request, the second shared memory address that corresponds to the service identifier; and sending, by the Service Manager process, the service identifier, the first shared memory address, and the second shared memory address that corresponds to the service identifier to the user process, such that the user process maps the first shared memory that corresponds to the first shared memory address and second shared memory that corresponds to the second shared memory address to virtual address space of the user process.

In a first possible implementation manner of the first aspect, before the receiving, by the Service Manager process, a registration message of a system service process, the method further includes sending, by the Service Manager process, a startup message of the Service Manager process to all remote Monitors by use of a local agent service monitor, where the startup message carries the first shared memory address, such that all the remote Monitors map the first shared memory that corresponds to the first shared memory address to virtual address space of all the remote Monitors, to establish connections between the Service Manager process and all the remote Monitors, where all the remote Monitors include a Monitor of the user process and a Monitor of the system service process; the receiving, by the Service Manager process, a registration message of a system service process includes receiving, by the Service Manager process, the registration message of the system service process by use of the Monitor of the system service process; the sending, by the Service Manager process, a response message of the registration message to the system service process includes sending, by the Service Manager process, the response message of the registration message to the system service process by use of the Monitor of the system service process; the receiving, by the Service Manager process, a system service request of a user process includes receiving, by the Service Manager process, the system service request of the user process by use of the Monitor of the user process; and the sending, by the Service Manager process, the service identifier, the first shared memory address, and the second shared memory address that corresponds to the service identifier to the user process includes sending, by the Service Manager process, the service identifier, the first shared memory address, and the second shared memory address that corresponds to the service identifier to the user process by use of the Monitor of the user process.

In a second possible implementation manner of the first aspect, the method includes, when the system service process is migrated to a destination microkernel, receiving and recording, by the Service Manager process, the service identifier of the system service process and a third shared memory address that corresponds to the service identifier; receiving, by the Service Manager process, the system service request of the user process, and finding, according to the service identifier carried by the system service request, a third shared memory address that corresponds to the service identifier carried by the system service request; sending, by the Service Manager process, the third shared memory address to the user process, such that the user process maps third shared memory that corresponds to the third shared memory address to the virtual address space of the user process; and forwarding, by the Service Manager process, the system service request of the user process to the system service process, such that the system service process processes the system service request of the user process and sends a processing result to the user process.

According to a second aspect, an inter-manycore communications method includes applying, by a system service process, to a microkernel operating system for shared memory, and mapping second shared memory, which is allocated by the microkernel operating system, to virtual address space of the system service process; sending, by the system service process, a registration message to a Service Manager process, where the registration message carries a service identifier of the system service process and a second shared memory address that corresponds to the service identifier; and receiving, by the system service process, a response message of the registration message, where the response message is sent by the Service Manager process, and correspondingly mapping first shared memory that corresponds to a first shared memory address carried by the response message to the virtual address space of the system service process.

In a first possible implementation manner of the second aspect, the method further includes, when the system service process is migrated to a destination microkernel, applying, by the system service process, to the microkernel operating system for the shared memory, and mapping third shared memory, which is allocated by the microkernel operating system, to the virtual address space of the system service process; and sending, by the system service process, the service identifier of the system service process and a third shared memory address that corresponds to the service identifier to the Service Manager process.

According to a third aspect, an inter-manycore communications system is provided, where the communications system includes a mapping unit configured to apply to a microkernel operating system for shared memory, and map first shared memory, which is allocated by the microkernel operating system, to virtual address space of a Service Manager process; a receiving unit configured to receive a registration message of a system service process, and record a service identifier of the system service process and a second shared memory address that corresponds to the service identifier, where the service identifier and the second shared memory address are carried by the registration message; a response unit configured to send a response message of the registration message to the system service process, where the response message carries a first shared memory address; where the receiving unit is further configured to receive a system service request of a user process, and find, according to a service identifier carried by the system service request, the second shared memory address that corresponds to the service identifier; and a sending unit configured to send the service identifier, the first shared memory address, and the second shared memory address that corresponds to the service identifier to the user process, such that the user process maps the first shared memory that corresponds to the first shared memory address and second shared memory that corresponds to the second shared memory address to virtual address space of the user process.

In a first possible implementation manner of the third aspect, the sending unit is further configured to send a startup message of the Service Manager process to all remote Monitors by use of a local agent service monitor, where the startup message carries the first shared memory address, such that all the remote Monitors map the first shared memory that corresponds to the first shared memory address to virtual address space of all the remote Monitors, to establish connections between the Service Manager process and all the remote Monitors, where all the remote Monitors include a Monitor of the user process and a Monitor of the system service process; the receiving unit is configured to receive the registration message of the system service process by use of the Monitor of the system service process, and record the service identifier of the system service process and the second shared memory address that corresponds to the service identifier, where the service identifier and the second shared memory address are carried by the registration message; and receive the system service request of the user process by use of the Monitor of the user process, and find, according to the service identifier carried by the system service request, the second shared memory address that corresponds to the service identifier; the response unit is configured to send the response message of the registration message to the system service process by use of the Monitor of the system service process; and the sending unit is configured to send the service identifier, the first shared memory address, and the second shared memory address that corresponds to the service identifier to the user process by use of the Monitor of the user process.

In a second possible implementation manner of the third aspect, the receiving unit is further configured to, when the system service process is migrated to a destination microkernel, receive and record, the service identifier of the system service process and a third shared memory address that corresponds to the service identifier; the receiving unit is further configured to receive the system service request of the user process, and find, according to the service identifier carried by the system service request, a third shared memory address that corresponds to the service identifier; the sending unit is further configured to send the third shared memory address to the user process, such that the user process maps third shared memory that corresponds to the third shared memory address to the virtual address space of the user process; and the sending unit is further configured to forward the system service request of the user process to the system service process, such that the system service process processes the system service request of the user process and sends a processing result to the user process.

According to a fourth aspect, an inter-manycore communications system is provided, where the communications system includes a mapping unit configured to apply to a microkernel operating system for shared memory, and map second shared memory, which is allocated by the microkernel operating system, to virtual address space of a system service process; a sending unit configured to send a registration message to a Service Manager process, where the registration message carries a service identifier of the system service process and a second shared memory address that corresponds to the service identifier; and a receiving unit configured to receive a response message of the registration message, where the response message carries a first shared memory address; and map the first shared memory that corresponds to the first shared memory address to the virtual address space of the system service process.

In a first possible implementation manner of the fourth aspect, the mapping unit is further configured to, when the system service process is migrated to a destination microkernel, apply to the microkernel operating system for the shared memory, and map, to the virtual address space of the system service process, third shared memory that corresponds to a third shared memory address and is allocated by the microkernel operating system; and the sending unit is further configured to send the service identifier of the system service process and a third shared memory address that corresponds to the service identifier to the Service Manager process.

BRIEF DESCRIPTION OF DRAWINGS

To describe the technical solutions in the embodiments of the present disclosure more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer and more comprehensible, the following describes the present disclosure in further detail with reference to the accompanying drawings and embodiments. It should be understood that the embodiments described herein are merely used to explain the present disclosure but are not intended to limit the present disclosure.

Figure 4:
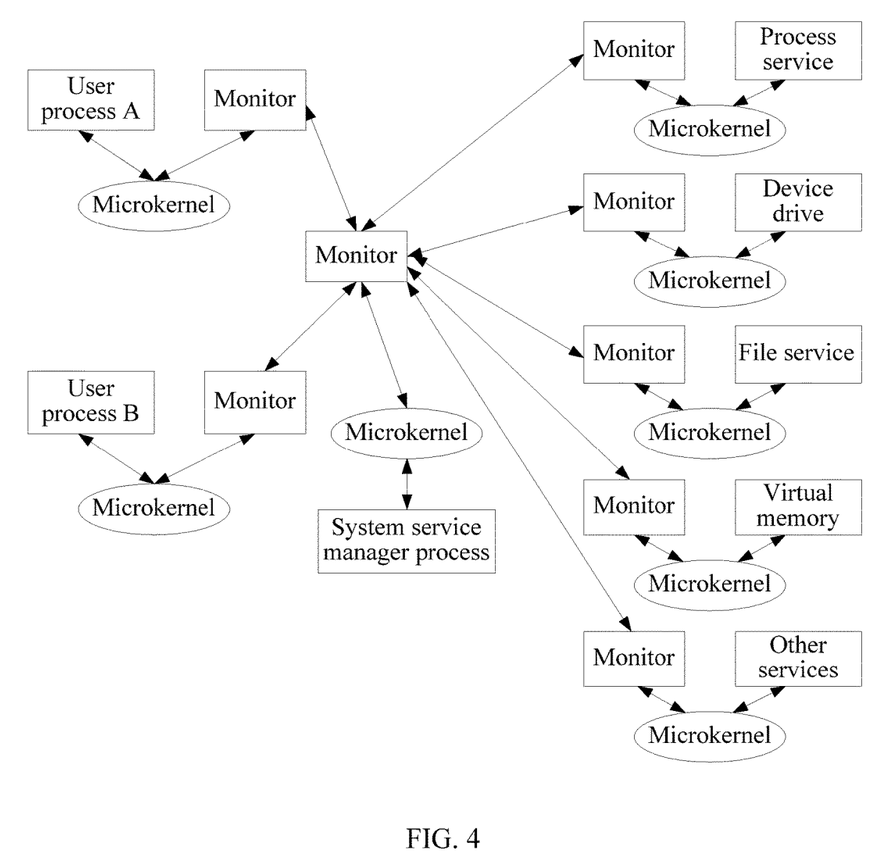
FIG. 4 is a schematic diagram of a scenario to which an inter-manycore communications method applies according to an embodiment of the present disclosure.

FIG. 4 shows a scenario to which an inter-manycore communications method applies according to an embodiment of the present disclosure.

In this embodiment, all microkernels use a same microkernel operating system, a specific microkernel is designated in the system, and a specific service manager process runs in a single-kernel and single-thread manner to process all services provided by the system and manage establishment of a communication connection between a system service process requested by a user and a user process. The user process includes a user process A and a user process B, and the system service process includes a process service, device drive, a file service, virtual memory, and other services.

In this embodiment, when a system service process calls another system service process, the system service process that actively initiates calling is used as a user process, and the process that is called is used as a system service process.

One agent service Monitor runs on each microkernel, and all Monitors may be fully connected to each other, that is, every two Monitors are connected.

Figure 5:
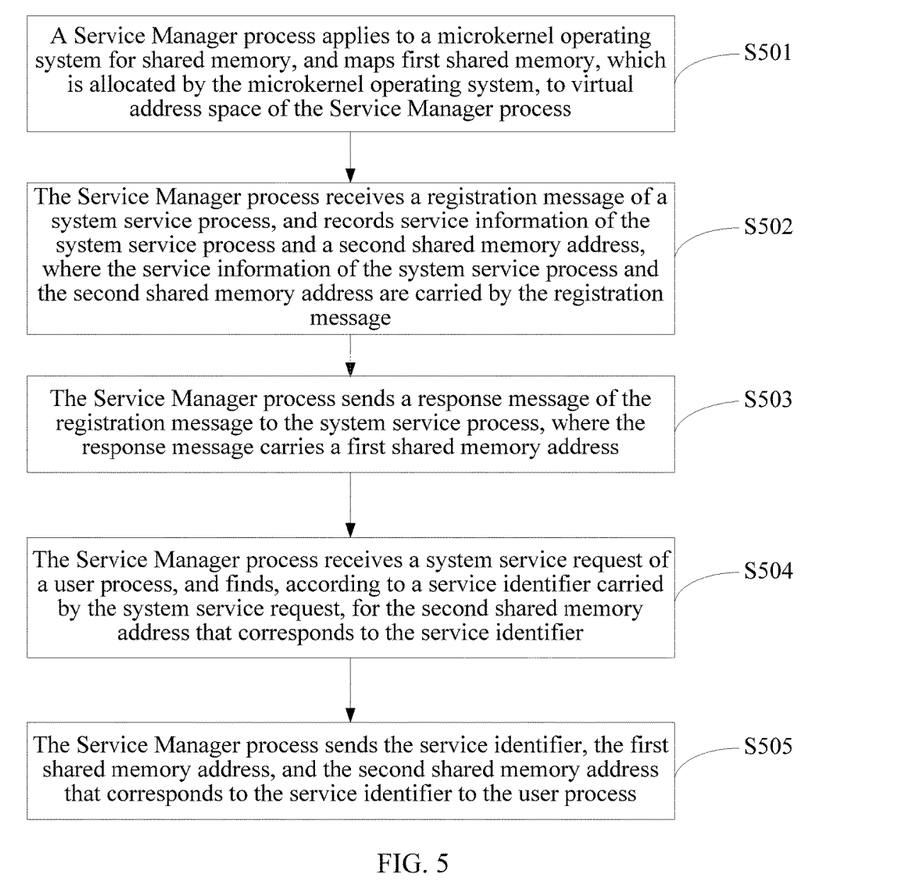
FIG. 5 is an implementation flowchart of an inter-manycore communications method according to another embodiment of the present disclosure.

FIG. 5 shows an implementation procedure of an inter-manycore communications method according to an embodiment of the present disclosure. This embodiment is executed by a Service Manager. A procedure of the method is described in detail as follows.

In step S501, a Service Manager process applies to a microkernel operating system for shared memory, and maps first shared memory, which is allocated by the microkernel operating system, to virtual address space of the Service Manager process.

It should be noted that, when being started, the Service Manager process applies to the microkernel operating system for the shared memory, and the foregoing microkernel operating system is an operating system used by a microkernel on which the Service Manager process is located.

In this specification, the terms "first", "second", and "third" do not indicate a sequence, but are used to distinguish shared memory from a shared memory address. The first shared memory is shared memory allocated by a memory management module of the microkernel operating system to the Service Manager process, and an address of the first shared memory is a first shared memory address.

In this embodiment, the Service Manager process, a system service process, and a user process are located on different microkernels of a same processor or located on microkernels of multiple different processors.

As shown in Table 1, the memory management module of the microkernel operating system divides a linear memory address into three parts, including kernel space, user space, and shared memory space, where the shared memory space is allocated from 0xf . . . f, and a first specific shared memory area is specially allocated to the Service Manager process for use, and remaining shared memory space is allocated to the system service process. After being started, the system service process applies to the microkernel operating system for a piece of memory of a fixed size, which is referred to as shared memory of the system service process herein, that is, second shared memory; or after the system service process is migrated to a destination microkernel, the system service process reapplies to the microkernel operating system for a piece of memory of a fixed size, which is also referred to as shared memory of the system service process herein, that is, third shared memory.

TABLE 1

| Kernel space | User space | Shared memory of a system service process | . . . | Shared memory of a system service process Start | Specific shared memory area 0xf . . . f |
|---|---|---|---|---|---|

In step S502, the Service Manager process receives a registration message of a system service process, and records service information of the system service process and a second shared memory address, where the service information of the system service process and the second shared memory address are carried by the registration message.

In this embodiment, after startup of the system service process is completed, the system service process first applies to the microkernel operating system for a shared memory address of the system service process, that is, the second shared memory address, and then registers with the Service Manager process. During registration, the system service process sends the service information of the system service process and the second shared memory address to the Service Manager process, where the service information includes a service identifier, and the service identifier corresponds to the second shared memory address.

It should be noted that service identifiers are used to distinguish different system service processes, and herein, the service identifiers may be implemented using numbers, letters, or other manners. There is a correspondence between the service identifier of the system service process and the second shared memory address, each system service process has a corresponding service identifier, each system service process has allocated second shared memory, and an address of the second shared memory is a second shared memory address. Therefore, the service identifier of the system service process is in a one-to-one correspondence with the second shared memory address of the system service process. The Service Manager process records the service identifier of the system service process and the second shared memory address that corresponds to the service identifier.

Implementation manners in which the Service Manager process receives the registration message of the system service process include the following manners.

Manner 1: A Monitor of the system service process receives the registration message of the system service process from the system service process, a Monitor of the Service Manager process receives the registration message of the system service process from the Monitor of the system service process, and the Service Manager process receives the registration message of the system service process from the Monitor of the Service Manager process.

Manner 2: The Service Manager process receives the registration message of the system service process by use of a Monitor of the system service process.

It should be noted that Manner 2 is more efficient, because an intermediate part, that is, an operation performed by the Monitor of the Service Manager process, is omitted.

In step S503, the Service Manager process sends a response message of the registration message to the system service process, where the response message carries a first shared memory address.

In this embodiment, the system service process maps the first shared memory to virtual address space of the system service process according to the first shared memory address, which can implement direct communication between the Service Manager process and the system service process.

Implementation manners in which the Service Manager process sends the response message of the registration message to the system service process include the following manners.

Manner 1: The Service Manager process sends the response message of the registration message to the Monitor of the Service Manager process, the Monitor of the Service Manager process sends the response message of the registration message to the Monitor of the system service process, and the Monitor of the system service process sends the response message of the registration message to the system service process.

Manner 2: The Service Manager process sends the response message of the registration message to the system service process by use of the Monitor of the system service process.

It should be noted that in Manner 2, the Service Manager process directly communicates with the Monitor of the system service process, and an intermediate part, that is, an operation performed by the Monitor of the Service Manager process, is omitted.

In step S504, the Service Manager process receives a system service request of a user process, and finds, according to a service identifier carried by the system service request, the second shared memory address that corresponds to the service identifier.

Implementation manners in which the Service Manager process receives the system service request of the user process include the following manners.

Manner 1: A Monitor of the user process receives the system service request of the user process from the user process, the Monitor of the Service Manager process receives the system service request of the user process from the Monitor of the user process, and the Service Manager process receives the system service request of the user process from the Monitor of the Service Manager process.

Manner 2: The Service Manager process receives the system service request of the user process by use of a Monitor of the user process.

It should be noted that in Manner 2, the Service Manager process directly communicates with the user process, and an intermediate part, that is, an operation performed by the Monitor of the Service Manager process, is omitted.

In step S505, the Service Manager process sends the service identifier, the first shared memory address, and the second shared memory address that corresponds to the service identifier to the user process, such that the user process maps the first shared memory that corresponds to the first shared memory address and second shared memory that corresponds to the second shared memory address to virtual address space of the user process.

It should be noted that an objective of sending the service identifier to the user process is that the user process can distinguish a first shared memory address and a second shared memory address.

In this embodiment, the user process receives the first shared memory address and the second shared memory address, and maps the first shared memory and the second shared memory to the virtual address space of the user process according to the first shared memory address and the second shared memory address, thereby implementing direct communication between the user process, the Service Manager process, and the system service process, and solving a problem in the prior art that communication between the user process and the system service process needs multiple context switches.

An implementation manner of the communication between the user process and the system service process is shown in Table 2. A message stored in shared memory of each system service process is divided into two parts, including a header and a message body, where the header is used to set an identifier of a system service, and the message body includes an allocation bitmap, a preparation bitmap, and a message block, where the allocation bitmap is used to indicate whether the message block is in an idle state or is used, and the preparation bitmap is used to indicate whether the message block has prepared a message to be processed.

Each time requesting a service, a user first searches the allocation bitmap to apply for an idle message block, after the application succeeds, modifies a corresponding flag bit in the allocation bitmap and operates the message block to enter message content, and further modifies a corresponding flag bit in the preparation bitmap. After finding that there is a message block with the flag bit in the preparation bitmap, the system service process reads content in the message block, provides a service, and after completion, resets the corresponding flag bit in the allocation bitmap and the corresponding flag bit in the preparation bitmap.

TABLE 2

| Header | Allocation bitmap | Preparation bitmap | Message block 1 | ... | Message block n | Idle message block |
|---|---|---|---|---|---|---|

Implementation manners in which the Service Manager process sends the service identifier, the first shared memory address, and the second shared memory address that corresponds to the service identifier to the user process include the following manners.

Manner 1: The Service Manager process sends the service identifier, the first shared memory address, and the second shared memory address that corresponds to the service identifier to the Monitor of the Service Manager process, the Monitor of the Service Manager process sends the service identifier, the first shared memory address, and the second shared memory address that corresponds to the service identifier to the Monitor of the user process, and the Monitor of the user process sends the service identifier, the first shared memory address, and the second shared memory address that corresponds to the service identifier to the user process.

Manner 2: The Service Manager process sends the service identifier, the first shared memory address, and the second shared memory address that corresponds to the service identifier to the Monitor of the user process, and the Monitor of the user process sends the service identifier, the first shared memory address, and the second shared memory address that corresponds to the service identifier to the user process.

Optionally, after step S501 and before step S502, the method further includes sending, by the Service Manager process, a startup message of the Service Manager process to all remote Monitors by use of a local agent service Monitor, where the startup message carries the first shared memory address, such that all the remote Monitors map the first shared memory that corresponds to the first shared memory address to virtual address space of all the remote Monitors, to establish connections between the Service Manager process and all the remote Monitors, where all the remote Monitors include a Monitor of the user process and a Monitor of the system service process; that the Service Manager process receives the registration message of the system service process is that the Service Manager process receives the registration message of the system service process by use of the Monitor of the system service process; that the Service Manager process sends the response message of the registration message to the system service process is that the Service Manager process sends the response message of the registration message to the system service process by use of the Monitor of the system service process; that the Service Manager process receives the system service request of the user process is that the Service Manager process receives the system service request of the user process by use of the Monitor of the user process; and that the Service Manager process sends the service identifier, the first shared memory address, and the second shared memory address that corresponds to the service identifier to the user process is specifically that the Service Manager process sends the service identifier, the first shared memory address, and the second shared memory address that corresponds to the service identifier to the user process by use of the Monitor of the user process.

In this embodiment, with the foregoing method, when the Service Manager process sends a message to the system service process or receives a message from the system service process, the Service Manager process directly uses the Monitor of the system service process, and when the Service Manager process sends a message to the user process or receives a message from the user process, the Service Manager process directly uses the Monitor of the user process.

In this embodiment, with the foregoing method, the Service Manager process directly communicates with the Monitor of the user process and the Monitor of the system service process, such that it is unnecessary for the user process and the system service process to use the Monitor of the Service Manager process each time the user process and the system service process communicate with the Service Manager process, thereby improving communication efficiency of a system.

Optionally, the method further includes, when the system service process is migrated to a destination microkernel, receiving and recording, by the Service Manager process, the service identifier of the system service process and a third shared memory address that corresponds to the service identifier; receiving, by the Service Manager process, the system service request of the user process, and finding, according to the service identifier carried by the system service request, a third shared memory address that corresponds to the service identifier; sending, by the Service Manager process, the third shared memory address to the user process, such that the user process maps third shared memory that corresponds to the third shared memory address to the virtual address space of the user process; and forwarding, by the Service Manager process, the system service request of the user process to the system service process, such that the system service process processes the system service request of the user process and sends a processing result to the user process.

In this embodiment, when the system service process is migrated, the service identifier of the system service process is not changed, but the system service process needs to reapply, using the destination microkernel to which the system service process is migrated, to the microkernel operating system for shared memory of the system service process, that is, the foregoing third shared memory. An address of the third shared memory is a third shared memory address, and the third shared memory address herein is used to be distinguished from an original second shared memory address.

In this embodiment, when the system service process is migrated, the user process cannot communicate with the system service process according to the original second shared memory address, but sends the system service request to the Service Manager process. The Service Manager process finds a third shared memory address updated and registered by the system service process, and sends the third shared memory address to the user process, such that the user process can directly communicate with the migrated system service process, and the Service Manager process forwards a system service request of the user process to the migrated system service process. Using simple steps, communication between the user process and the migrated system service process can be implemented.

Figure 6:
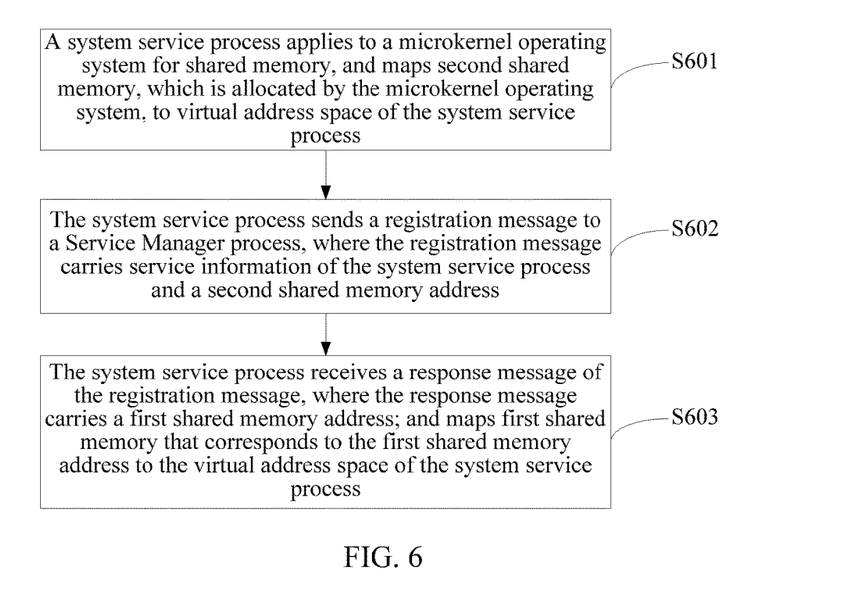
FIG. 6 is an implementation flowchart of an inter-manycore communications method according to another embodiment of the present disclosure.

FIG. 6 shows an implementation procedure of an inter-manycore communications method according to another embodiment of the present disclosure. This embodiment is executed by a system service process. A procedure of the method is described in detail as follows.

In step S601, a system service process applies to a microkernel operating system for shared memory, and maps second shared memory, which is allocated by the microkernel operating system, to virtual address space of the system service process.

It should be noted that the microkernel operating system refers to an operating system used by a microkernel on which the system service process is located.

In step S602, the system service process sends a registration message to a Service Manager process, where the registration message carries service information of the system service process and a second shared memory address.

In this embodiment, the service information of the system service process includes a service identifier of the system service process, and the service identifier corresponds to the second shared memory address.

In step S603, the system service process receives a response message of the registration message, where the response message carries a first shared memory address; and maps first shared memory that corresponds to the first shared memory address to the virtual address space of the system service process.

Optionally, the method further includes, when the system service process is migrated to a destination microkernel, applying, by the system service process, to the microkernel operating system for the shared memory, and mapping third shared memory, which is allocated by the microkernel operating system, to the virtual address space of the system service process; and sending, by the system service process, the service identifier of the system service process and a third shared memory address that corresponds to the service identifier to the Service Manager process.

Figure 7:
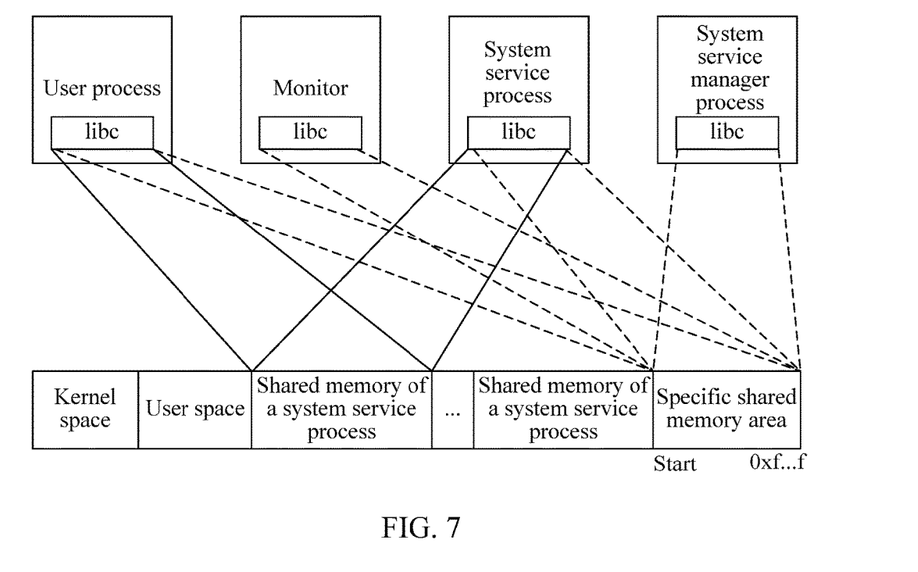
FIG. 7 is a schematic diagram of a method for operating shared memory according to another embodiment of the present disclosure.

FIG. 7 shows a method for operating shared memory according to another embodiment of the present disclosure. The method is described in detail as follows.

A microkernel operating system provides libc to operate system shared memory. The present disclosure provides a set of application programming interfaces (API) to implement a method for operating shared memory by the microkernel operating system.

A user process, a Monitor, a system service process, and a Service Manager process separately map shared memory of the Service Manager process, that is, first shared memory, to their respective virtual address space, such that the Service Manager process can directly communicate with the user process, the Monitor, and the system service process.

It should be noted that the Monitor herein includes all the remote Monitors described above.

The user process and the system service process separately map shared memory of the system service process, that is, second shared memory or third shared memory, to their respective virtual address space, such that the user process can directly communicate with the system service process.

Figure 8:
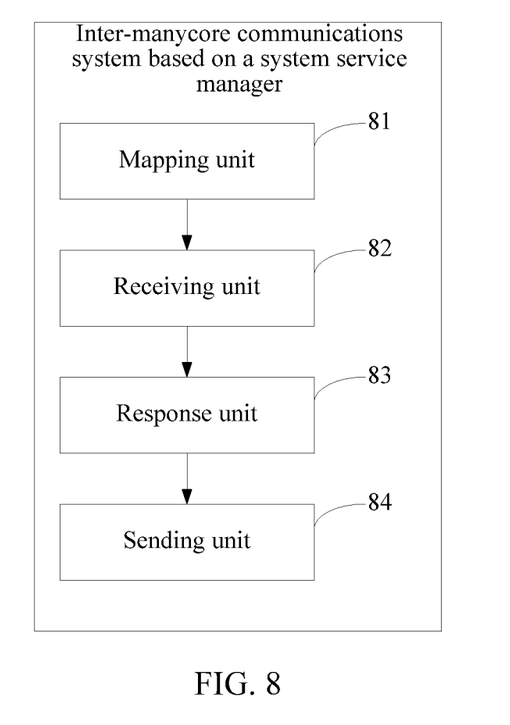
FIG. 8 is a structural composition diagram of an inter-manycore communications system according to another embodiment of the present disclosure.

FIG. 8 shows a composition structure of an inter-manycore communications system according to another embodiment of the present disclosure, and for ease of description, shows only a part related to this embodiment of the present disclosure.

The inter-manycore communications system includes a mapping unit 81 configured to apply to a microkernel operating system for shared memory, and map first shared memory, which is allocated by the microkernel operating system, to virtual address space of a Service Manager process; a receiving unit 82 configured to receive a registration message of the system service process, and record service information of a system service process and a second shared memory address, where the service information of the system service process and the second shared memory address are carried by the registration message; a response unit 83 configured to send a response message of the registration message to the system service process, where the response message carries a first shared memory address; where the receiving unit 82 is further configured to receive a system service request of a user process, and find, according to a service identifier carried by the system service request, for the second shared memory address that corresponds to the service identifier; and a sending unit 84 configured to send the service identifier, the first shared memory address, and the second shared memory address that corresponds to the service identifier to the user process, such that the user process maps the first shared memory that corresponds to the first shared memory address and second shared memory that corresponds to the second shared memory address to virtual address space of the user process.

Optionally, the sending unit 84 is further configured to send a startup message of the Service Manager process to all remote Monitors by use of a local agent service Monitor, where the startup message carries the first shared memory address, such that all the remote Monitors map the first shared memory that corresponds to the first shared memory address to virtual address space of all the remote Monitors, to establish connections between the Service Manager process and all the remote Monitors, where all the remote Monitors include a Monitor of the user process and a Monitor of the system service process.

Optionally, the receiving unit 82 is further configured to, when the system service process is migrated to a destination microkernel, receive and record, the service identifier of the system service process and a third shared memory address that corresponds to the service identifier; the receiving unit 82 is further configured to receive the system service request of the user process, and find, according to the service identifier carried by the system service request, for a third shared memory address that corresponds to the service identifier; the sending unit 84 is further configured to send the third shared memory address to the user process, such that the user process maps third shared memory that corresponds to the third shared memory address to the virtual address space of the user process; and the sending unit 84 is further configured to forward the system service request of the user process to the system service process, such that the system service process processes the system service request of the user process and sends a processing result to the user process.

The inter-manycore communications system provided in this embodiment may be used in the foregoing corresponding inter-manycore communications method. For details, refer to related description of the embodiment corresponding to the foregoing inter-manycore communications method shown in FIG. 5, and the details are not described herein again.

Figure 9:
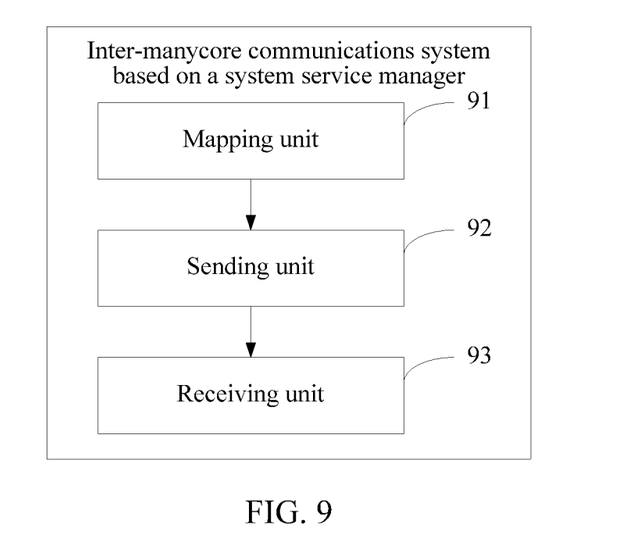
FIG. 9 is a structural composition diagram of an inter-manycore communications system according to another embodiment of the present disclosure.

FIG. 9 shows a composition structure of an inter-manycore communications system according to another embodiment of the present disclosure, and for ease of description, shows only a part related to this embodiment of the present disclosure.

The inter-manycore communications system includes a mapping unit 91 configured to apply to a microkernel operating system for system service shared memory, and map second shared memory, which is allocated by the microkernel operating system, to virtual address space of a system service process; a sending unit 92 configured to send a registration message to a Service Manager process, where the registration message carries service information of the system service process and a second shared memory address that corresponds to a service identifier; and a receiving unit 93 configured to receive a response message of the registration message, where the response message carries a first shared memory address; and map first shared memory that corresponds to the first shared memory address to the virtual address space of the system service process.

Optionally, the mapping unit 91 is further configured to, when the system service process is migrated to a destination microkernel, apply to the microkernel operating system for a shared memory address, and map, to the virtual address space of the system service process, third shared memory that corresponds to a third shared memory address and is allocated by the microkernel operating system; and the sending unit 92 is further configured to send the service identifier of the system service process and a third shared memory address that corresponds to the service identifier to the Service Manager process.

The inter-manycore communications system provided in this embodiment may be used in the foregoing corresponding inter-manycore communications method. For details, refer to related description of the embodiment corresponding to the foregoing inter-manycore communications method shown in FIG. 6, and details are not described herein again.

Figure 10:
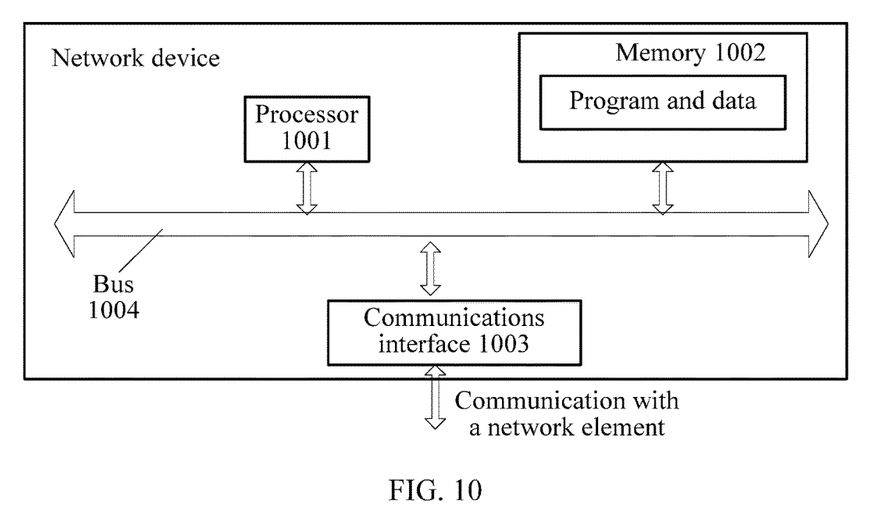
FIG. 10 is a structural composition diagram of a network device according to another embodiment of the present disclosure.

FIG. 10 shows a composition structure of a network device according to another embodiment of the present disclosure, and for ease of description, shows only a part related to this embodiment of the present disclosure.

The network device includes a processor 1001, a memory 1002, a communications interface 1003, and a bus 1004.

The processor 1001, the memory 1002, and the communications interface 1003 are connected to each other by the bus 1004; and the bus 1004 may be an industry standard architecture (ISA) bus, a peripheral component interconnect (PCI) bus, or the like.

The foregoing processor 1001 is a manycore general purpose processor or includes multiple processors, including a CPU, a network processor (NP), or the like.

The processor 1001 is configured to control a Service Manager process to apply to a microkernel operating system for shared memory, and map first shared memory, which is allocated by the microkernel operating system, to virtual address space of the Service Manager process; control a system service process to send a registration message of the system service process to the Service Manager process; control the Service Manager process to receive and record a service identifier of the system service process and a second shared memory address that corresponds to the service identifier, where the service identifier and the second shared memory address are carried by the registration message; control the Service Manager process to send a response message of the registration message to the system service process, where the response message carries a first shared memory address; control a user process to send a system service request to the Service Manager process; control the Service Manager process to find, according to a service identifier carried by the system service request, the second shared memory address that corresponds to the service identifier; control the Service Manager process to send the service identifier, the first shared memory address, and the second shared memory address that corresponds to the service identifier to the user process; and control the user process to map first shared memory that corresponds to the first shared memory address and second shared memory that corresponds to the second shared memory address to virtual address space of the user process.

Optionally, the processor 1001 is further configured to control the Service Manager process to send a startup message of the Service Manager process to all remote Monitors by use of a local agent service monitor, where the startup message carries the first shared memory address; and control all the remote Monitors to map the first shared memory that corresponds to the first shared memory address to virtual address space of all the remote Monitors, to establish connections between the Service Manager process and all the remotes Monitor, where all the remote Monitors include a Monitor of the user process and a Monitor of the system service process.

Optionally, the processor 1001 is further configured to, when the system service process is migrated to a destination microkernel, control the system service process to send the service identifier of the system service process and a third shared memory address that corresponds to the service identifier to the Service Manager process; control the Service Manager process to receive and record the service identifier of the system service process and the third shared memory address that corresponds to the service identifier; control the Service Manager process to send the third shared memory address to the user process, such that the user process maps third shared memory that corresponds to the third shared memory address to the virtual address space of the user process; control the Service Manager process to forward the system service request of the user process to the system service process; and control the system service process to process the system service request of the user process and send a processing result to the user process.

Figure 11:
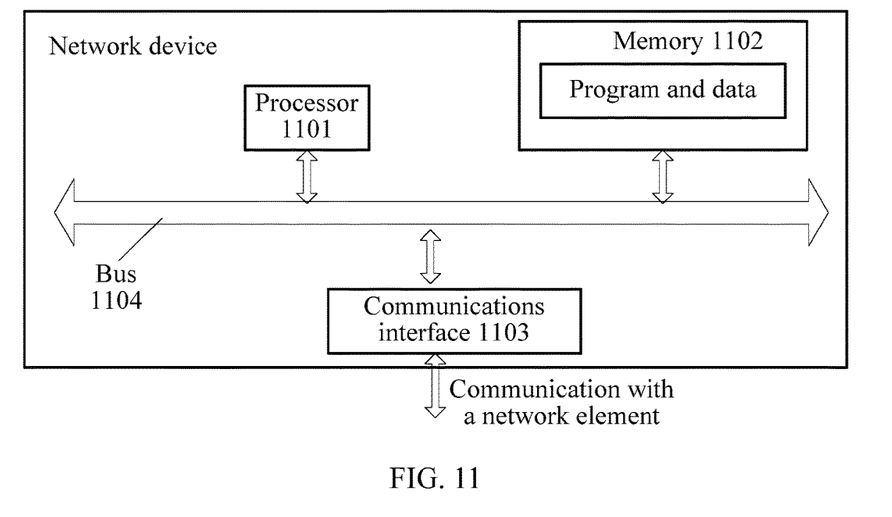
FIG. 11 is a structural composition diagram of a network device according to another embodiment of the present disclosure.

FIG. 11 shows a composition structure of a network device according to another embodiment of the present disclosure, and for ease of description, shows only a part related to this embodiment of the present disclosure.

The network device includes a processor 1101, a memory 1102, a communications interface 1103, and a bus 1104.

The processor 1101, the memory 1102, and the communications interface 1103 are connected to each other by the bus 1104; and the bus 1104 may be an ISA bus, a PCI bus, or the like.

The foregoing processor 1101 is a manycore general purpose processor or includes multiple processors, including a CPU, an NP, or the like.

The processor 1101 is configured to control a system service process to apply to a microkernel operating system for shared memory, and map second shared memory, which is allocated by the microkernel operating system, to virtual address space of the system service process; control the system service process to send a registration message to a Service Manager process, where the registration message carries a service identifier of the system service process and a second shared memory address that corresponds to the service identifier; control the Service Manager process to process the registration message of the system service process, and send a response message of the registration message to the system service process, where the response message carries a first shared memory address; and control the system service process to receive the response message, and correspondingly map first shared memory that corresponds to the first shared memory address to the virtual address space of the system service process.

Optionally, the processor 1101 is further configured to, when the system service process is migrated to a destination microkernel, control the system service process to apply to the microkernel operating system for the shared memory, and map third shared memory, which is allocated by the microkernel operating system, to the virtual address space of the system service process; and control the system service process to send the service identifier of the system service process and a third shared memory address that corresponds to the service identifier to the Service Manager process.

A person of ordinary skill in the art may also understand that all or a part of the steps of the methods in the foregoing embodiments may be implemented by a program instructing relevant hardware. The program may be stored in a readable storage medium. The storage medium includes a read-only memory (ROM)/random access memory (RAM) or the like.

The foregoing descriptions are merely exemplary embodiments of the present disclosure, but are not intended to limit the present disclosure. Any modification, equivalent replacement, or improvement made without departing from the spirit and principle of the present disclosure shall fall within the protection scope of the present disclosure.

What is claimed is:

1. An inter-manycore communications method, comprising:
    applying, by a Service Manager process, to a microkernel operating system of a first microkernel space for shared memory, and mapping first shared memory, which is allocated by the microkernel operating system, to virtual address space of the Service Manager process, wherein the Service Manager process is located in a second microkernel space;
    receiving, by the Service Manager process, a registration message of a system service process, and recording a service identifier of the system service process and a second shared memory address that corresponds to the service identifier, wherein the service identifier and the second shared memory address are carried by the registration message, wherein the system service is located in a third microkernel space, and wherein the first microkernel space, the second microkernel space, and the third microkernel space are in different microkernel spaces;
    sending, by the Service Manager process, a response message of the registration message to the system service process, wherein the response message carries a first shared memory address;
    receiving, by the Service Manager process, a system service request of a user process, and finding, according to a service identifier carried by the system service request, the second shared memory address that corresponds to the service identifier; and
    sending, by the Service Manager process, the service identifier, the first shared memory address and the second shared memory address that corresponds to the service identifier to the user process, wherein the first shared memory that corresponds to the first shared memory address and the second shared memory that corresponds to the second shared memory address is mapped to virtual address space of the user process in response to sending the service identifier, the first shared address, and the second shared memory address that corresponds to the service identifier to the user process.

2. The method according to claim 1, wherein the method further comprises:
sending a startup message of the Service Manager process to all remote Monitors by use of a local agent service Monitor, wherein the startup message carries the first shared memory address, such that all the remote Monitors map the first shared memory that corresponds to the first shared memory address to virtual address space of all the remote Monitors, to establish connections between the Service Manager process and all the remote Monitors, wherein all the remote Monitors comprise a Monitor of the user process and a Monitor of the system service process;
receiving the registration message of the system service process by use of the Monitor of the system service process;
sending the response message of the registration message to the system service process by use of the Monitor of the system service process; receiving the system service request of the user process by use of the Monitor of the user process; and
sending the service identifier, the first shared memory address, and the second shared memory address that corresponds to the service identifier to the user process by use of the Monitor of the user process.

3. The method according to claim 1, further comprising:
receiving and recording the service identifier of the system service process and a third shared memory address that corresponds to the service identifier when the system service process is migrated to a destination microkernel;
receiving the system service request of the user process, and finding, according to the service identifier carried by the system service request, for the third shared memory address that corresponds to the service identifier carried by the system service request;
sending the third shared memory address to the user process, such that the user process maps third shared memory that corresponds to the third shared memory address to the virtual address space of the user process; and
forwarding the system service request of the user process to the system service process, such that the system service process processes the system service request of the user process and sends a processing result to the user process.

4. An inter-manycore communications method, comprising:
applying, by a system service process, to a microkernel operating system of a first microkernel space for shared memory, and mapping second shared memory, which is allocated by the microkernel operating system, to virtual address space of the system service process;
sending, by the system service process, a registration message to a Service Manager process, wherein the registration message carries a service identifier of the system service process and a second shared memory address that corresponds to the service identifier, wherein the Service Manager process is located in a second microkernel space; and
receiving, by the system service process, a response message of the registration message from the Service Manager process, and correspondingly mapping first shared memory that corresponds to a first shared memory address carried by the response message to the virtual address space of the system service process, wherein the first shared memory that corresponds to the first shared memory address is mapped to virtual address space of a user process in response to mapping the first shared memory that corresponds to the first shared memory address to the virtual address space of the system service process, and wherein the first microkernel space and the second microkernel space are in different microkernel spaces.

5. The method according to claim 4, further comprising:
applying, by the system service process, when the system service process is migrated to a destination microkernel, to the microkernel operating system for the shared memory, and mapping third shared memory, which is allocated by the microkernel operating system, to the virtual address space of the system service process; and
sending, by the system service process, the service identifier of the system service process and a third shared memory address that corresponds to the service identifier to the Service Manager process.

6. A network device, comprising:
a processor;
a memory comprising instructions;
a communications interface; and
a bus, wherein the processor, the memory and the communications interface are connected to each other by the bus, and wherein the instructions cause the processor to be configured to:
control a Service Manager process to apply to a microkernel operating system of a first microkernel space for shared memory, and map first shared memory, which is allocated by the microkernel operating system, to virtual address space of the Service Manager process, wherein the Service Manager process is located in a second microkernel space, wherein the first microkernel space and the second microkernel space in different microkernel spaces;
control a system service process to send a registration message of the system service process to the Service Manager process;
control the Service Manager process to receive and record a service identifier of the system service process and a second shared memory address that corresponds to the service identifier, wherein the service identifier and the second shared memory address are carried by the registration message;
control the Service Manager process to send a response message of the registration message to the system service process, wherein the response message carries a first shared memory address;
control a user process to send a system service request to the Service Manager process;
control the Service Manager process to find, according to a service identifier carried by the system service request, the second shared memory address that corresponds to the service identifier;
control the Service Manager process to send the service identifier, the first shared memory address, and the second shared memory address that corresponds to the service identifier to the user process; and
control the user process to map the first shared memory that corresponds to the first shared memory address and the second shared memory that corresponds to the second shared memory address to virtual address space of the user process in response to sending the service identifier, the first shared memory address, and the second shared memory address that corresponds to the service identifier to the user process.

7. The network device according to claim 6, wherein the instructions further cause the processor to be configured to:
control the Service Manager process to send a startup message of the Service Manager process to all remote Monitors by use of a local agent service Monitor, wherein the startup message carries the first shared memory address;
control all the remote Monitors to map the first shared memory that corresponds to the first shared memory address to virtual address space of all the remote Monitors, to establish connections between the Service Manager process and all the remote Monitors, wherein all the remote Monitors comprise a Monitor of the user process and a Monitor of the system service process; and
control the Service Manager process to:
receive the registration message of the system service process by use of the Monitor of the system service process, and record the service identifier of the system service process and the second shared memory address that corresponds to the service identifier, wherein the service identifier and the second shared memory address are carried by the registration message;
receive the system service request of the user process by use of the Monitor of the user process, and find, according to the service identifier carried by the system service request, the second shared memory address that corresponds to the service identifier;
send the response message of the registration message to the system service process by use of the Monitor of the system service process; and
send the service identifier, the first shared memory address, and the second shared memory address that corresponds to the service identifier to the user process by use of the Monitor of the user process.

8. The network device according to claim 6, wherein the instructions further cause the processor to be configured to:
control the system service process to send the service identifier of the system service process and a third shared memory address that corresponds to the service identifier to the Service Manager process when the system service process is migrated to a destination microkernel;
control the Service Manager process to receive and record the service identifier of the system service process and the third shared memory address that corresponds to the service identifier; control the Service Manager process to receive the system service request of the user process, and find, according to the service identifier carried by the system service request, the third shared memory address that corresponds to the service identifier; and control the Service Manager process to send the third shared memory address to the user process, such that the user process maps the third shared memory that corresponds to the third shared memory address to the virtual address space of the user process;
control the Service Manager process to forward the system service request of the user process to the system service process; and control the system service process to process the system service request of the user process and send a processing result to the user process.

9. A network device, comprising:
a processor;
a memory comprising instructions;
a communications interface;
a bus; and
wherein the processor, the memory and the communications interface are connected to each other by the bus, and wherein the instructions cause the processor to be configured to:
control a system service process to apply to a microkernel operating system of a first microkernel space for shared memory, and map second shared memory, which is allocated by the microkernel operating system, to virtual address space of the system service process;
control the system service process to send a registration message to a Service Manager process, wherein the registration message carries a service identifier of the system service process and a second shared memory address that corresponds to the service identifier, wherein the Service Manager process is located in a second microkernel space, wherein the first microkernel space and the second microkernel space are in different microkernel spaces;
control the Service Manager process to process the registration message of the system service process, and send a response message of the registration message to the system service process, wherein the response message carries a first shared memory address; and
control the system service process to receive the response message of the registration message, wherein the response message carries the first shared memory address, and map the first shared memory that corresponds to the first shared memory address to the virtual address space of the system service process, wherein the first shared memory that corresponds to the first shared memory address is mapped to virtual address space of a user process in response to mapping the first shared memory that corresponds to the first shared memory address to the virtual address space of the system service process.

10. The network device according to claim 9, wherein the instructions further cause the processor to be configured to:
control the system service process to apply to the microkernel operating system for the shared memory, when the system service process is migrated to a destination microkernel, and map, to the virtual address space of the system service process, third shared memory that corresponds to a third shared memory address and is allocated by the microkernel operating system; and
control the system service process to send the service identifier of the system service process and a third shared memory address that corresponds to the service identifier to the Service Manager process.

* * * * *